(12) United States Patent
Messina et al.

(10) Patent No.: US 7,260,277 B2
(45) Date of Patent: Aug. 21, 2007

(54) METHOD FOR OBTAINING A HIGH-RESOLUTION DIGITAL IMAGE

(75) Inventors: Giuseppe Messina, Giardini Naxos (IT); Sebastiano Battiato, Acicatena (IT); Massimo Mancuso, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1003 days.

(21) Appl. No.: 10/420,532

(22) Filed: Apr. 22, 2003

(65) Prior Publication Data

US 2004/0027488 A1 Feb. 12, 2004

(51) Int. Cl.
  *G06K 9/32* (2006.01)
(52) U.S. Cl. .................................................. 382/299
(58) Field of Classification Search ........ 382/298–300, 382/254, 107, 284, 294, 236; 348/222.1, 348/272–273, 218.1, 36–39, 584; 358/514, 358/540, 1.9
  See application file for complete search history.

(56) References Cited

U.S. PATENT DOCUMENTS

| | | | | |
|---|---|---|---|---|
| 6,330,344 B1 * | 12/2001 | Kondo et al. | ............... | 382/107 |
| 6,720,997 B1 * | 4/2004 | Horie et al. | ............. | 348/218.1 |
| 2004/0032511 A1 * | 2/2004 | Messina et al. | ......... | 348/222.1 |

FOREIGN PATENT DOCUMENTS

| | | |
|---|---|---|
| EP | 0677821 | 10/1995 |
| WO | 00/59206 | 10/2000 |

OTHER PUBLICATIONS

Battiato et al., Adaptive Technique For Digital Image Resolution Enhancement, IEEE 0-7803-7300-6/02, pp. 48-49.*

(Continued)

*Primary Examiner*—Ishrat Sherali
(74) *Attorney, Agent, or Firm*—Lisa K. Jorgenson; Allen, Dyer, Doppelt, Milbrath & Gilchrist, P.A.

(57) ABSTRACT

A method for obtaining a high-resolution digital image from a plurality of starting images formed by pixel matrices acquired at a lower resolution includes combining the plurality of starting images to generate a provisional high-resolution image, and producing from the provisional high-resolution image a plurality of low-resolution images. Each low-resolution image corresponds to a respective starting image. At least a portion of the provisional high-resolution image is processed by modifying pixels thereof to reduce a difference between the plurality of starting images and the plurality of low-resolution images. The processing includes associating with the pixels of the provisional high-resolution image a respective uncertainty measure representing an uncertainty of the pixels, and leaving unmodified at least a subset of the pixels of the provisional high-resolution image having associated therewith a respective uncertainty measure smaller than a threshold.

33 Claims, 6 Drawing Sheets

OTHER PUBLICATIONS

Irani et al., *Super Resolution from Image Sequences*, Proceedings of the International Conference on Pattern Recognition, Atlantic City, Jun. 16-21, 1990, Los Alamitos, IEEE Comp. Soc. Press, US, vol. 2 Conf. 10, Jun. 16, 1990, pp. 115-120 XP000166484.

Murai Tekalp et al., *High-Resolution Image Reconstruction from Lower-Resolution Image Sequences and Space-Varying Image Restoration*, Multidimensional Signal Processing, San Francisco, Mar. 23-26, 1992, Proceedings of the International Conference on Acoustics, Speech and Signal Processing, New York, IEEE, US, vol. 3 Conf. 17, Mar. 23, 1992, pp. 169-172, XP000378900.

Bose et al., *High-Resolution Image Reconstruction with Multisensors*, International Journal of Imaging Systems and Technology, 1998, Wiley, USA, vol. 9, No. 4, pp. 294-304, XP002215334.

Dufaux et al., *Efficient, Robust, and Fast Global Motion Estimation for Video Coding*, IEEE Transactions on Image Processing, IEEE Inc., New York, US, vol. 9, No. 3, Mar. 2000, pp. 497-501, XP000908674.

Smolic et al., *Robust Global Motion Estimation Using a Simplified M-Estimator Approach*, Proceedings 2000 International Conference on Image Processing (Cat. No. 00CH37101), Proceedings of 7th IEEE International Conference on Image Processing, Vancouver, BC, Canada, Sep. 10-13, 2000, pp. 868-871, vol. 1, XP002215335, 2000, Piscataway, NJ, USA.

\* cited by examiner

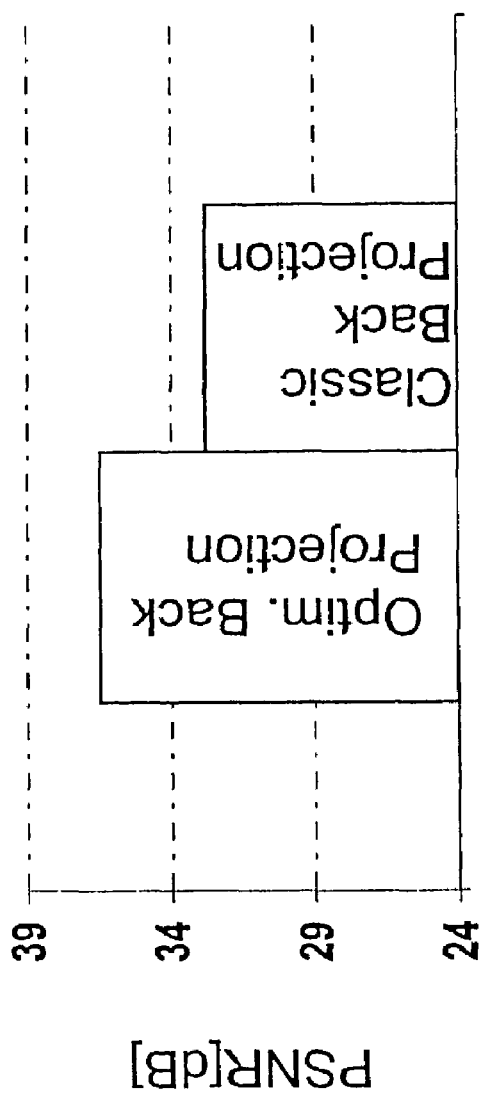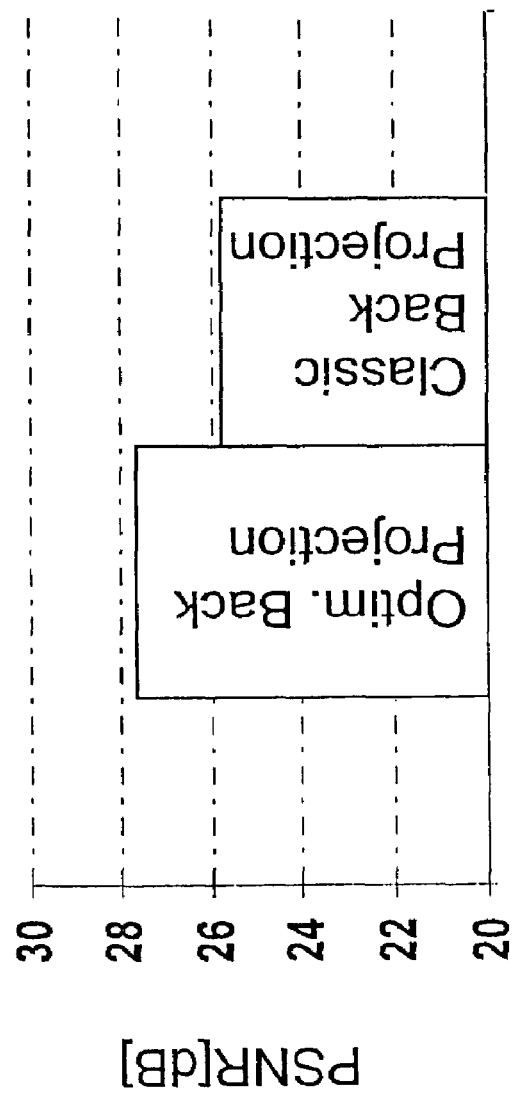

METHOD FOR OBTAINING A HIGH-RESOLUTION DIGITAL IMAGE

FIELD OF THE INVENTION

The present invention relates to the acquisition and processing of digital images, and more particularly, to a method for obtaining a high-resolution image by processing several low-resolution images representing the same real scene.

BACKGROUND OF THE INVENTION

Digital images are currently used in many different applications. These applications include new-generation acquisition devices, such as digital still cameras (DCS). The availability of sensors providing increased resolutions at lower costs, such as low consumption digital signal processors (DSP), have led to a considerable commercial diffusion of digital still cameras. For this reason, there is now a need for low-cost acquisition devices that will also make possible the acquisition of high-quality digital images.

The quality of an image substantially depends on the characteristics of the sensor that acquires the image, especially its resolution. The sensor, which in digital still cameras, will typically be either a CCD (Charge Coupled Device) or a CMOS (Complementary Metal Oxide Semiconductor). These sensors are integrated circuits comprising a matrix of photosensitive cells or elements, each associated with a corresponding pixel. When the image is acquired from a real scene, each cell produces an electrical signal proportional to the light that strikes it. More precisely, each cell responds to the radiance (emitted quantity of light) of a particular portion of the real scene. These particular portions of the real scene form the receptive field of the pixel.

The larger the number of photosensitive cells or the greater the spatial resolution of the sensor (which amounts to the same thing), the information relating to the real scene captured in the acquisition process will be denser. But the choice of obtaining a higher image resolution by stepping up the sensor resolution in terms of the number of pixels is not always feasible because of technology and cost.

When acquiring a digital photograph, a sensor, no matter how good its resolution, will always produce an approximation of the scene that is to be shot. The photosensitive cells of the sensor are always separated by a certain distance because not all of the sensor area can be uniformly covered with photosensitive elements. Technology makes it inevitable that there should be a certain minimum distance between adjacent cells. This spacing between adjacent cells is the cause of a first loss of information in the acquisition process.

Another reason why a digital image acquired with a sensor of the type that is commonly used in digital still cameras forms only an approximation of the real scene is due to the interpolation process of the data acquired by the sensor. As is well known, a digital image can be represented by a matrix of elements (pixels) corresponding to elementary portions of the image, and each of these elements has associated with it one or more digital values representative of the optical components. In a monochromatic image, for example, only a single digital value is associated with each pixel. In this case, it is usually said that the image is made up of only a single channel or plane.

In a color image, which may be in a RGB (Red, Green and Blue) format, each pixel has associated with it three digital values that correspond, respectively, to the three components (red, green, blue) of the additive chromatic synthesis. In this case, the image can be broken down into three distinct planes. Each plane contains the information relating to just one of the chromatic components.

A typical sensor will dedicate a single and substantially monochromatic photosensitive cell to each pixel of the image. Furthermore, the sensor is provided with an optical filter that includes a matrix of filtering elements, each of which covers one photosensitive cell. Subject to a minimal absorption, each filtering element transmits to the photosensitive cell with which it is associated the luminous radiation corresponding to the wavelength of only the red light, only the green light or only the blue light. For each pixel there is thus revealed just one of the three primary components (R, G, B) of the additive chromatic synthesis.

The type of filter employed varies from one manufacturer to another. The most common is the so-called Bayer filter. In this filter the arrangement of the filtering elements, the so-called Bayer pattern, is as shown in the element matrix 10 reproduced in FIG. 2.

The electrical signals produced by the photosensitive cells are converted into digital values in accordance with conventional methods. The digital image obtained in this manner is incomplete because it is made up of only a single component (R, G or B) for each pixel. The format of this image is conventionally referred to as a CFA (Color Filter Array) image.

The CFA image is then subjected to a complex reconstruction process to produce a "complete" image in the RGB format, for example, in which three digital values will be associated with each pixel. This reconstruction implies a passage from a representation of the image in a single plane (Bayer plane) to a representation in three planes (R, G, B). The reconstruction is obtained by well known interpolation algorithms.

It should be noted that the interpolation produces only an approximation of the image that would be obtained with a sensor capable of acquiring three optical components per pixel. Therefore, the interpolation process introduces yet another approximation into the acquired image. Given these limitations of the quality of the acquired image introduced by the sensor characteristics and the interpolation process, further processing operations are often required to obtain a high-resolution digital image.

The prior art proposes numerous methods that are generally based on the principle of reconstructing the original information of the real scene lost in the acquisition process for the reasons set out above, by combining the information contained in a plurality of initially acquired low-resolution digital images that all represent the same scene. To this end, it is essential that the initially acquired images, which will be referred to more briefly as the starting images, should together form some additional information that could not be obtained from identical images.

Some of the known methods comprise operate in the space domain (that is, in the pixel domain) and others in the frequency domain. The latter combines a certain number of low-resolution starting images after having transformed them in the spatial frequency domain. After the image in the frequency domain obtained from this combination has been brought back into the space domain, it has a better resolution than the starting images. However, the methods operating in the frequency domain call for a very considerable computational effort.

The methods that operate in the space domain, on the other hand, comprise a particular class that employs an approach known as "back projection", which is very similar to the one utilized, for example, in so-called computerized axial tomography (CAT), in which a two-dimensional object is reconstructed from a series of one-dimensional projections thereof.

The back-projection approach assumes that the low-resolution starting images of the same scene represent different projections of a high-resolution image that reproduces the real scene. The projection operator is the same acquisition process, which depends to a large extent on the acquisition device, is assumed to be known. The problem is thus reduced to reconstructing the high-resolution image from its various projections.

In particular, the method employed by M. Irani and S. Peleg, described among others in "Super Resolution From Image Sequences" (IEEE, 1990), obtains an iterative reconstruction of the high-resolution image by correcting/improving this image in several successive steps on the basis of the differences between the starting images and images obtained by simulation from the projections of the high-resolution image as from time to time corrected or improved by iteration.

This method is associated with a first drawback that derives from the fact that obtaining high-quality images calls for an accurate modeling of the acquisition process or device that obtains the low-resolution images. For this reason, the method in question is complicated and does not lend itself to being implemented in a commercial acquisition device, such as a digital still camera.

A second difficulty is based upon the fact that the method calls for a considerable number of processing operations at each iteration step and this, in its turn, implies numerous problems in devices in which the optimization of the energy, processing and memorization resources are a factor that has an important bearing on their commercial success.

SUMMARY OF THE INVENTION

The present invention therefore sets out to make available a method for obtaining high-resolution images that will not give rise to the drawbacks of the prior art methods that have just been described.

A method for obtaining a high-resolution digital image from a plurality of starting images formed by pixel matrices acquired at a lower resolution comprises combining the plurality of starting images to generate a provisional high-resolution image, and producing from the provisional high-resolution image a plurality of low-resolution images. Each low-resolution image may correspond to a respective starting image.

The method may further comprise processing at least a portion of the provisional high-resolution image by modifying pixels thereof to reduce a difference between the plurality of starting images and the plurality of low-resolution images. In particular, the processing may comprise associating with the pixels of the provisional high-resolution image a respective uncertainty measure representing an uncertainty of the pixels, and leaving unmodified at least a subset of the pixels of the provisional high-resolution image having associated therewith a respective uncertainty measure smaller than a threshold. The term "high resolution image" as used in connection with the present invention is to be understood as referring to an image, no matter what its resolution is, that is represented on a larger number of pixels than the pixels of the starting images.

Another aspect of the presenting invention is directed to an acquisition device comprising an acquisition unit for acquiring analog values representing a plurality of starting images, an analog-to-digital converter for converting the analog values into digital values, and an image generation unit receiving the digital values of the plurality of starting images. The image generation unit may combine the digital values of the plurality of starting images to generate a provisional high-resolution image, and producing from the provisional high-resolution image a plurality of low-resolution images. Each low-resolution image may correspond to a respective starting image.

The image generation unit may also processing at least a portion of the provisional high-resolution image by modifying pixels thereof to reduce a difference between the plurality of starting images and the plurality of low-resolution images by associating with the pixels of the provisional high-resolution image a respective uncertainty measure representing an uncertainty of the pixels, and leaving unmodified at least a subset of the pixels of the provisional high-resolution image having associated therewith a respective uncertainty measure smaller than a threshold.

BRIEF DESCRIPTION OF THE DRAWINGS

Further characteristics and advantages of the invention will brought out more clearly by the detailed description about to be given of a preferred embodiment thereof, which is to be considered as an example and is not to be limited in any way, with the description making reference to the attached drawings of which:

FIGS. 6a and 6b show the results of further experimental tests relating to the method in accordance with the present invention.

DETAILED DESCRIPTION OF THE PREFERRED EMBODIMENTS

The preferred embodiment of the present invention concerns a portable device capable of acquiring digital images, and more particularly, a digital still camera. The principles of the present invention can be extended also to applications other than those explicitly mentioned in the present description. These other applications include new generation support and multimedia communication terminals.

Figure 1:
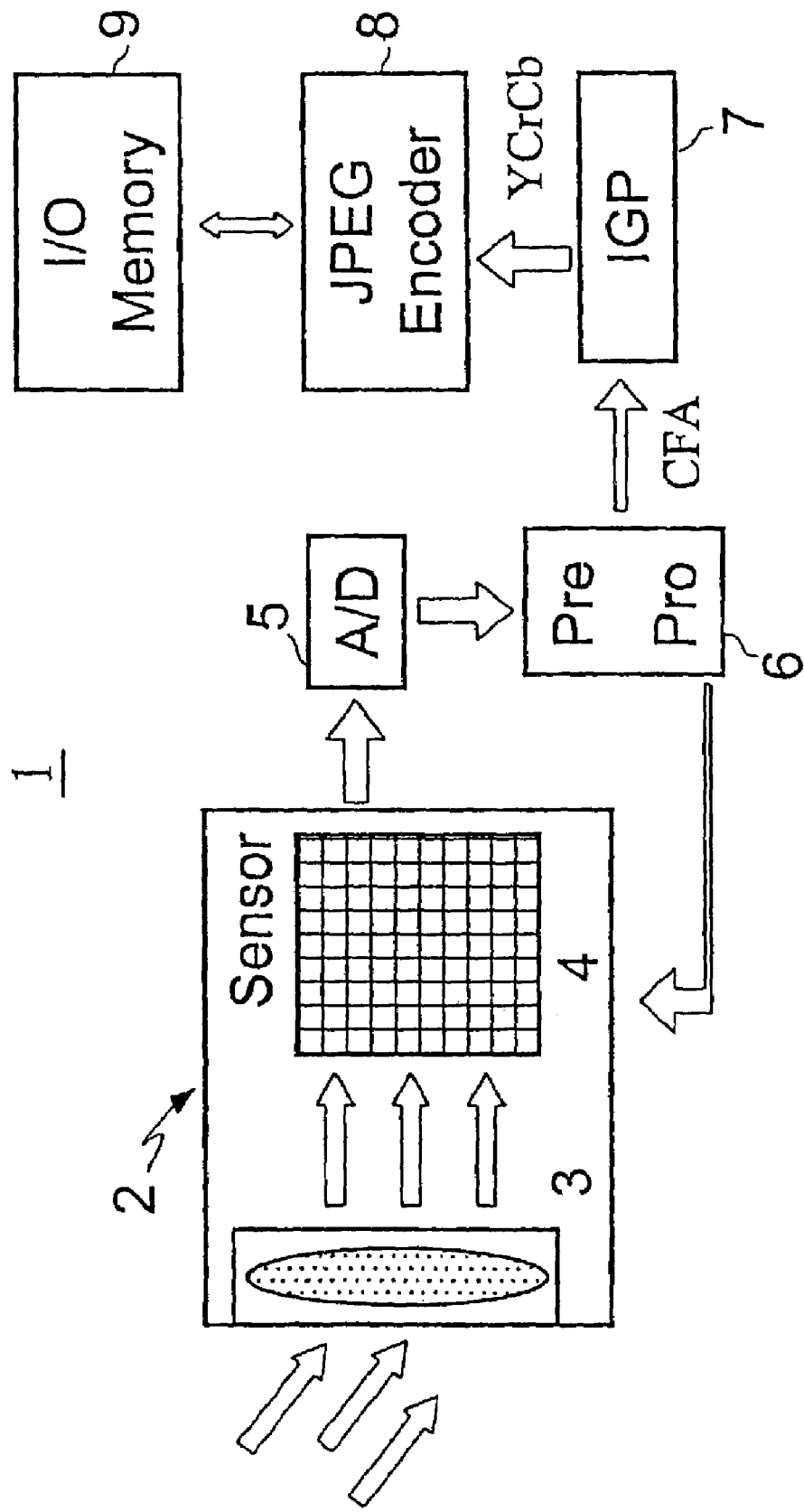
FIG. 1 shows a schematic representation of a possible acquisition device that implements the method in accordance with the present invention.
Figure 2:
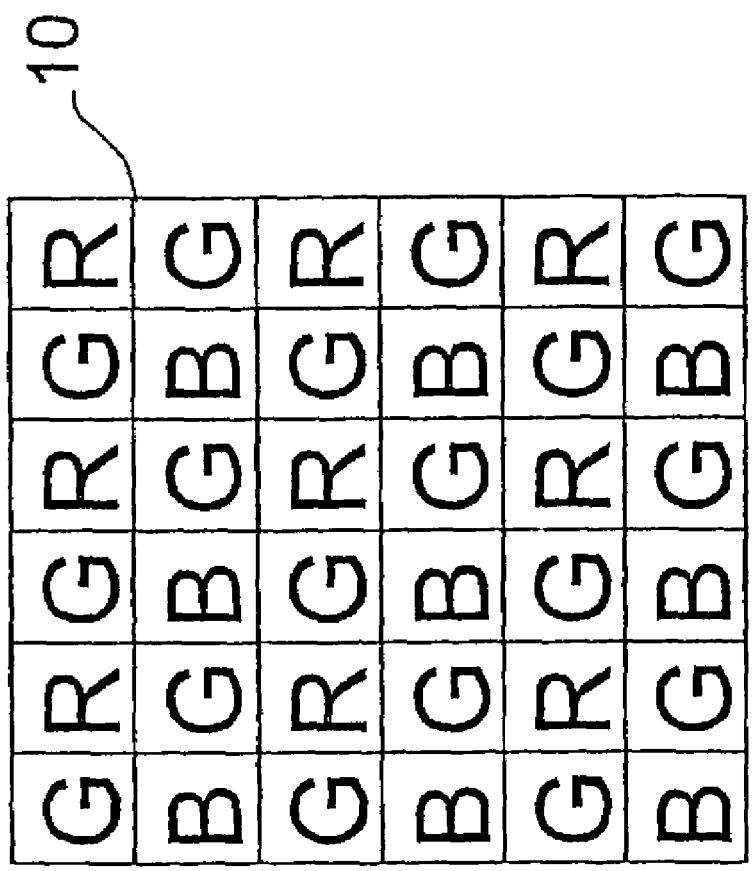
FIG. 2 shows the manner in which the filtering elements are arranged in a sensor filter of the Bayer type that can be employed in the device of FIG. 1.

As can be seen in FIG. 1, a digital still camera 1 includes an acquisition block 2 comprising a lens system with a diaphragm 3 and a sensor 4. The diaphragm 3 serves to focus the light radiations produced by a real scene onto the sensor 4.

Sensor 4, which among others may be of the CCD or CMOS type, is an integrated circuit comprising a matrix of photosensitive cells, each of which serves to generate an electrical signal proportional to the quantity of light that strikes it during the acquisition interval. In a preferred embodiment the sensor 4 comprises an optical filter with a Bayer matrix.

The digital still camera 1 also includes an A/D converter, indicated by the reference number 5, to transform the signal generated by each photosensitive cell into a digital value with a predetermined number of bits (generally 8, 10 or 12 bits). By way of example and without introducing any limitations, the A/D converter 5 encodes the incoming analog signals into digital values represented with 8 bits. In this case, the digital values of the pixels will be between a minimum binary value equal to 0 and a maximum binary value equal to 255.

The digital image forming the output of the A/D converter 5 is in the CFA format since it is made up of just one chromatic component per pixel. This means that just a single 8-bit digital value will be associated with each pixel.

A pre-processing (or PrePro) unit 6, active before and during the entire acquisition phase, interacts with the acquisition block 2 and extracts from the CFA image a number of parameters useful for carrying out automatic control functions, such as automatic focusing, automatic exposure, correction of sensor defects, and white balancing.

A unit 7, described as an IGP (Image Generation Pipeline), performs a processing phase to obtain a high-resolution digital image. In digital still cameras, the unit 7 is commonly realized in the form of a dedicated processor (CFA processor), possibly in VLSI (Very Large Scale Integration) technology.

In particular, the processing phase performed in the IGP unit 7 produces from the incomplete digital starting image in the CFA format a complete digital image in the YcrCb format, for example, in which three digital values (24 bits), i.e., a luminance component Y and two chrominance components Cr and Cb, are associated with each pixel. This transformation, obtained via interpolation, for example, implies passage from a representation of the image in a single plane (Bayer plane) that contains the information relating to the different chromatic components, to a representation in three planes.

Preferably, the IGP block 7 will also carry out various functions for improving the image quality, including filtering the noise introduced by the sensor 4, applying special effects and other functions that will generally vary in both number and type from one manufacturer to another. Without introducing any limitations, it is assumed that the unit 7 carries out the operations involved in the method for obtaining high-resolution digital images in accordance with the present invention. In a different embodiment, however, these operations could also be performed in a separate block. The IPG block 7 is followed by an encoder/compression block 8 that is generally of the JPEG type. The compressed image may be saved in a memory unit 9 or sent to an external peripheral unit.

In the present example, the method in accordance with the invention is applied to a plurality of low-resolution starting images. For sake of brevity, this plurality will hereinafter be referred to also by such expressions as "starting plurality" or "starting images".

According to a particular embodiment of the invention, the starting images may be in the YcrCb format and include square pixel matrices of size n×n. For example, there is a specific case in which the method in accordance with the present invention produces a final image having a resolution stepped up by a factor M in every dimension.

The low-resolution starting images are acquired in sequence by the still camera 1 and the acquisition block 2, preferably separated from each other by only a short time interval and with slightly different orientations of the still camera. In a preferred embodiment several images (two or three, for example) will be acquired every time the user releases the shutter. It should be noted that the micro-oscillations of the still camera 1 between one acquisition and the next will be sufficient to generate images that, even when their relative misalignments are minimal, have different information contents. The micro-oscillations may be due to involuntary movements of the user's hand.

It should also be noted that the starting images acquired in this manner represent the same scene, and being relatively misaligned, reproduce portions of that scene that are different and at least partially superposed. Following acquisition, each of the starting images is converted into digital values by the A/D converter 5 and then processed in the preprocessing block 6.

The CFA-format images on the output side of the preprocessing block 6 are then sent to the IGP block 7. In this block each image is subjected to an interpolation phase, and is thus transformed into a complete low-resolution image in the YCrCb format, for example. The interpolation phase may be carried out, for example, by methods known to a person skilled in the art, and are disclosed based upon the previous description.

The method in accordance with the invention envisages operating separately on the planes or channels that make up the images. For the sake of simplicity, it is assumed that the method operates on the luminance planes Y of the starting images. The term "images" shall hereinafter be referred to as referring, in particular, only to the respective luminance components Y.

The chrominance planes Cr and Cb may be subjected to a procedure analogous to the one about to be described, though it is also conceivable to obtain a computational saving by applying the method only to the luminance plane Y, which represents the component to which the human eye is most sensitive.

The low-resolution starting images are subjected to an alignment or registering phase that includes an estimation of the misalignment of the images introduced in the acquisition phase. To this end one of the starting images, possibly the first one to be acquired, is selected as the reference image, estimating the amount by which the others are misaligned with respect to it.

The estimation of the misalignment may be obtained by conventional techniques of either the local motion or the global motion type. The latter are less complex as far as computational effort is concerned. In a preferred embodiment the technique employed is of the global motion type. For example, the techniques described in "Efficient, Robust and Fast Global Motion Estimation for Video Coding" (F. Dufaux, J. Konrad, IEEE Trans. On Image Processing, Vol. 9, No. 3, March 2000), and in "Robust Global Motion Estimation Using Simplified M-estimator Approach" (A. Smolic, J. R. Ohm, Proc. IEEE ICIP 2000, September 2000) have been found to be satisfactory.

The alignment phase is preferably realized in a high-precision manner by estimating the misalignments between the images even when they are on the order of fractions of a pixel (sub-pixel precision). Once the relative movement between the low-resolution starting images have been defined, these images are combined to generate a first approximation or estimate of the high-resolution image, in this example, they are of size (n×M)×(n×M), which hereinafter will also be referred to as "provisional high-resolution image."

Each starting image is first expanded to a resolution substantially equal to the resolution of the provisional image. In this particular example, the starting images are expanded to a resolution increased by a factor M in every dimension. This expansion is similar to an enlargement and may be obtained by simply reproducing each pixel in a grid or block of pixels having a size M×M. In a possible variation, however, any known enlargement algorithm of the intelligent/adaptive type, such as the bicubic type, for example, could be used for the expansion phase.

The expanded starting images are then combined pixel by pixel, taking due account of their relative misalignments. Each pixel of the provisional high-resolution image is generated by combining "common" pixels of the aligned and expanded starting images. The term common is to be understood as referring to the pixels of the starting images, or analogously to the expanded starting images, that represent or refer to the same elementary portion (receptive field) of the real scene.

Figure 3:
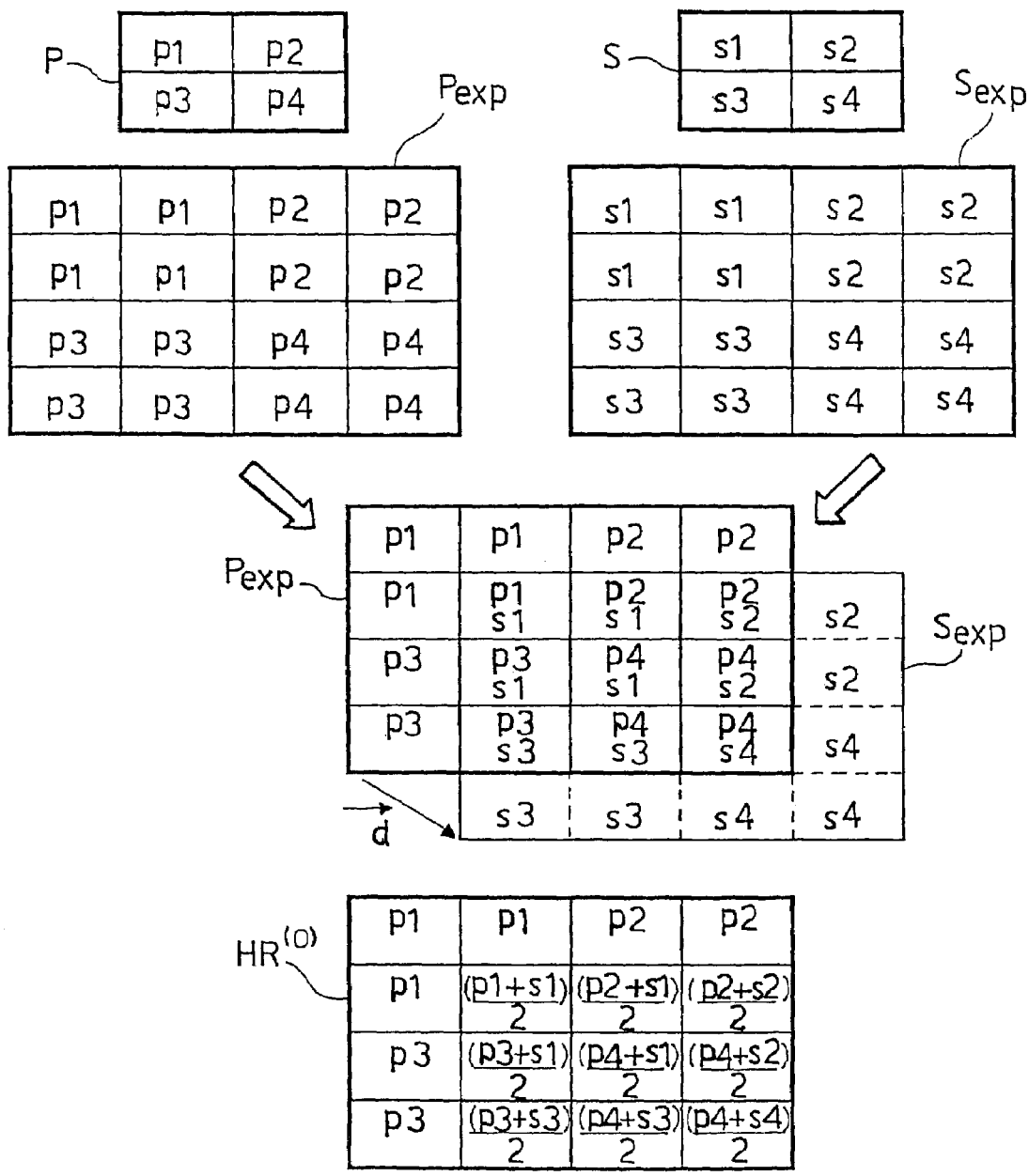
FIGS. 3 and 4 provide a simplified illustration of some steps of the method in accordance with the present invention.

By way of example, FIG. 3 illustrates a provisional high-resolution image $HR^{(0)}$ of size 4×4, starting from the combination of two low-resolution starting images of size 2×2. In particular, in FIG. 3 the image $HR^{(0)}$ is obtained from two starting images respectively indicated by P and S. Both P and S comprise four pixels, respectively p1, p2, p3, p4 and s1, s2, s3, s4. A generic pixel or more precisely, a digital value of the pixel of the provisional image $HR^{(0)}$ will be indicated by hr(x,y), where (x,y) represent the space coordinates of the pixel in the matrix.

FIG. 3 also shows the two expanded starting images, respectively $P_{exp}$ and $S_{exp}$, which correspond to the images P and S after they have been expanded by a factor M=2 in every dimension. As can be noted, the expanded starting images $P_{exp}$ and $S_{exp}$ are obtained by reproducing the pixels of the starting images in blocks of size M×M=4 of adjacent pixels. In this way each expanded image includes sixteen pixels.

FIG. 3 also shows the expanded images $P_{exp}$ and $S_{exp}$ misaligned with respect to each other by a vector $\vec{d}$. The estimate of this vector is obtained in the global motion alignment phase performed preferably on the low-resolution starting images P, S. For the purposes of this example, the reference image has been taken to be the image P and therefore also the expanded image $P_{exp}$.

There may be pixels $S_{exp}$ that are not superposed on pixels of $P_{exp}$. These pixels refer to portions of the real scene captured by the image S but not by P. But there are also regions of the scene that are captured by pixels of both images.

It should also be noted that the provisional high-resolution image comprises pixels equal to pixels of the reference image $P_{exp}$ in those regions of $P_{exp}$ that are not superposed on regions of the image $S_{exp}$, and contains also pixels obtained by combining common pixels of $P_{exp}$ and $S_{exp}$ in the superposed regions of $P_{exp}$ and $S_{exp}$. According to this particular example, the combination is a straightforward operation of averaging the common pixels.

Figure 4:
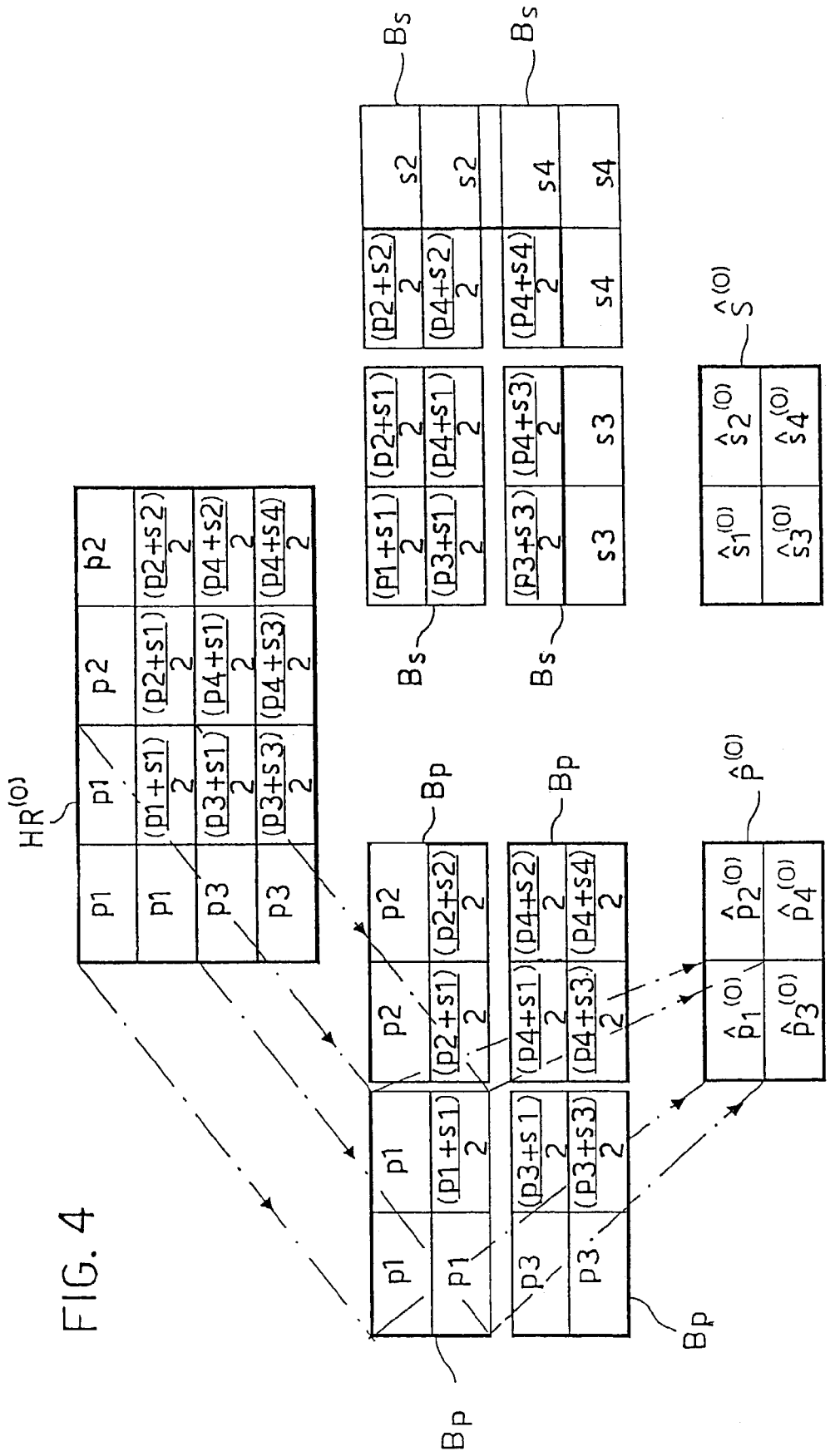

The pixels of the starting images not superposed on pixels of the reference image do not form part of the provisional high-resolution image $HR^{(0)}$. Once the provisional image $HR^{(0)}$ has been obtained, it is projected backwards as required by the back projection technique to produce another plurality of low-resolution images, each of which corresponds to a respective low-resolution image of the starting plurality. This projection is obtained by a simulation of the acquisition process, which in this case is represented by the set of all the operations performed by the still camera 1, which yields an interpolated digital image of the real scene. FIG. 4 shows the provisional image $HR^{(0)}$ and the back-projected low resolution images indicated by, respectively, $\hat{P}^{(0)}$ and $\hat{S}^{(0)}$.

According to the back projection approach, the provisional high-resolution image $HR^{(0)}$ is now considered as if it were the real scene and the simulation of the acquisition process produces further projected low-resolution images from it. Simulation of the acquisition process requires one to establish a model of this process for use in the processing.

This model will preferably be a function that expresses a link between the pixel blocks Bp, Bs of size M×M of the provisional high-resolution image $HR^{(0)}$ and individual pixels of the projected low-resolution images $\hat{P}^{(0)}$ and $\hat{S}^{(0)}$. This is effectively in line with what happens in the acquisition process, in which a pixel of a low-resolution image captures the information of the real scene, or more precisely, of the portion of the real scene that forms part of its receptive field.

For example, from the block Bp comprising the pixels with digital values p1, p1, p1, (p1+s1)/2 in FIG. 4 there is generated a pixel in the image $\hat{P}^{(0)}$. In a preferred embodiment this model or function makes it possible to produce from a pixel block Bp, Bs (of size M×M) of the provisional high-resolution image $HR^{(0)}$ a pixel in each projected image $\hat{P}^{(0)}$ or $\hat{S}^{(0)}$ that will be common with one of the starting images P, S that generated this block in the expansion phase.

A model, and even a very accurate one, of the acquisition process/device may be determined by conventional techniques for characterizing the employed components (for example, objective 3, sensor 4, etc.). Nevertheless, the method in accordance with the invention does not necessarily call for a very accurate model. For example, a model that approximates the acquisition process and has yielded good experimental results is a straightforward operation of averaging the pixels of the same block M×M of the provisional image $HR^{(0)}$.

In the present invention the provisional high-resolution image $HR^{(0)}$ is then iteratively processed, i.e., modified at least partly pixel by pixel, in such a way as to reduce a difference between corresponding images of the starting plurality of images and the plurality of projected images. This processing operation aims at improving the provisional high-resolution image at each iterative step and thus obtaining a definitive high-resolution image. In particular, this processing of the provisional image $HR^{(0)}$ can be continued to the point where no further improvement can be obtained, or a possible further improvement would not produce any appreciable results.

According to a preferred embodiment of the invention, whenever a provisional image $HR^{(0)}$ is to be processed, the projected images are used to evaluate a plurality of error or difference matrices obtained pixel by pixel as mathematical differences of the digital values of corresponding images of the plurality of starting images and the plurality of projected images. Each difference matrix will thus be associated with a respective image of the starting plurality and can be likened to a difference or error image.

The error matrices obtained in this manner are then subjected to the same procedure applied to the low-resolution starting images in the phase of producing the provisional high-resolution image $HR^{(0)}$. In this case, the error matrices are combined to obtain a high-resolution error grid or matrix. The error matrices are therefore subjected to an expansion phase and a subsequent operation of combining them in accordance with the alignment of the corresponding starting images. Following these operations, each pixel of the provisional high-resolution image $HR^{(0)}$ can be associated with an error obtained from a combination of errors associated with common pixels of the images of the starting plurality. For example, this combination operation can be an average of the absolute values or the squares of the errors associated with the common pixels of the starting images.

The provisional image HR$^{(0)}$ is processed at least partly by modifying the pixels on the basis of their respective associated errors. In a preferred embodiment, for example, each pixel is modified by adding the associated error to the pixel. In this way, one obtains an improved provisional high-resolution image HR$^{(1)}$ that can then be repeatedly projected (generating a respective plurality of improved low-resolution images) and improved.

Iterating this improvement/projection process, in which the plurality of starting images are not modified, whereas the further plurality and the provisional image are modified at each step, one obtains the final high-resolution image. As a general rule, the method can be terminated after just a few iterations.

On the basis of what has already been said, the processing phase is such as to modify at least a part of the provisional high-resolution image, and this happens because some pixels of this image can not be modified, and appear unchanged (with respect to the provisional image) in the final high resolution image.

According to the method of the present invention, in fact, once the provisional image HR$^{(0)}$ has been obtained, each pixel hr(x,y) of this image has associated with it a measure $D_u(x,y)$ that represents its uncertainty. The measure is obtained on the basis of the values of corresponding (common) pixels forming part of the starting images. The regions of the provisional high-resolution image HR$^{(0)}$ intended to be effectively improved are then selected pixel by pixel in the light of this measure.

In particular, it will be advantageous if the selection will leave unchanged all the pixels of the provisional image HR$^{(0)}$ with which there is associated an uncertainty measure $D_u(x,y)$ smaller than a predetermined threshold value T. The pixels with which there is associated a threshold value equal to or greater than the predetermined threshold value T, on the other hand, will all be modified, either wholly or in part, as described above.

The measure $D_u(x,y)$ associated with each pixel of the provisional high-resolution image, and representation of the uncertainty of this pixel can be obtained by statistically characterizing the distribution of the digital values of the common pixels of the starting images that, on being combined, generated this particular pixel in the provisional high-resolution image HR$^{(0)}$. Whenever a pixel of HR$^{(0)}$ has been generated by combining common low-resolution pixels having widely distributed, and therefore, widely different digital values, the pixel will be associated with a high uncertainty value. Otherwise, the pixel will be associated with a low uncertainty value.

According to a preferred embodiment of the invention, the uncertainty measure $D_u(x,y)$ associated with a pixel hr(x,y) of HR$^{(0)}$ will be equal to the difference between the maximum value Max(x,y) and the minimum value Min(x,y) of the values of the common pixels forming part of the (expanded) starting images that generated them upon being combined.

For example, if each pixel is represented by an 8-bit digital value, a pixel hr(x,y) of the provisional high-resolution image HR$^{(0)}$ will be left unchanged if $$D_u(x,y) = \text{Max}(x,y) - \text{Min}(x,y) < T$$

where the predetermined threshold value T will preferably be equal to about 10 or, even better, roughly equal to 5.

Furthermore, experimental results have shown that a computational savings can be obtained if, in addition to the pixels having low uncertainty measures, there are left unmodified pixels of the provisional image HR$^{(0)}$ obtained by combining common pixels having a range of digital values that are not readily perceived by the human visual system, i.e., the human eye. Typically, these pixels will form part of either well illuminated regions (regions in saturation) or excessively dark regions (noisy regions).

For example, if each pixel is represented by an 8-bit digital value, a pixel hr(x,y) of the provisional high-resolution image HR$^{(0)}$ will be left unchanged if $$\text{Max}(x,y) < S$$

or if $$\text{Min}(x,y) > L$$

where the predetermined threshold value S will preferably be substantially situated in the range of 5 to 10 and the predetermined threshold value L will be substantially situated in the range of 225 to 230.

These computational optimizations of the processing for obtaining a high-resolution digital image are carried out only once during the first step of the iteration procedure, and more precisely, either after or during the phase in which the provisional high-resolution image HR$^{(0)}$ is obtained.

As already mentioned, the processing terminates either when no further improvement can be obtained or when a possible further improvement would not produce any appreciable results. More particularly, with a view to increasing speed and stability, a pixel of the provisional high-resolution image will no longer be modified, i.e., left unchanged in the iteration process, whenever its associated error measure is smaller than a predetermined threshold.

In another possible embodiment the correction/modification of a high-resolution pixel would be carried out only if the correction is such as to reduce the error, failing which the pixel in question will be left unchanged in all subsequent iterations.

The method in accordance with the invention, because of evaluation of the uncertainty, obtains a considerable reduction of the number of pixels that have to be corrected/modified in the first step. This produces a significant reduction of the computation cost. The method of the present invention can therefore be advantageously utilized in applications that call for real-time processing capacity.

Figure 5A:
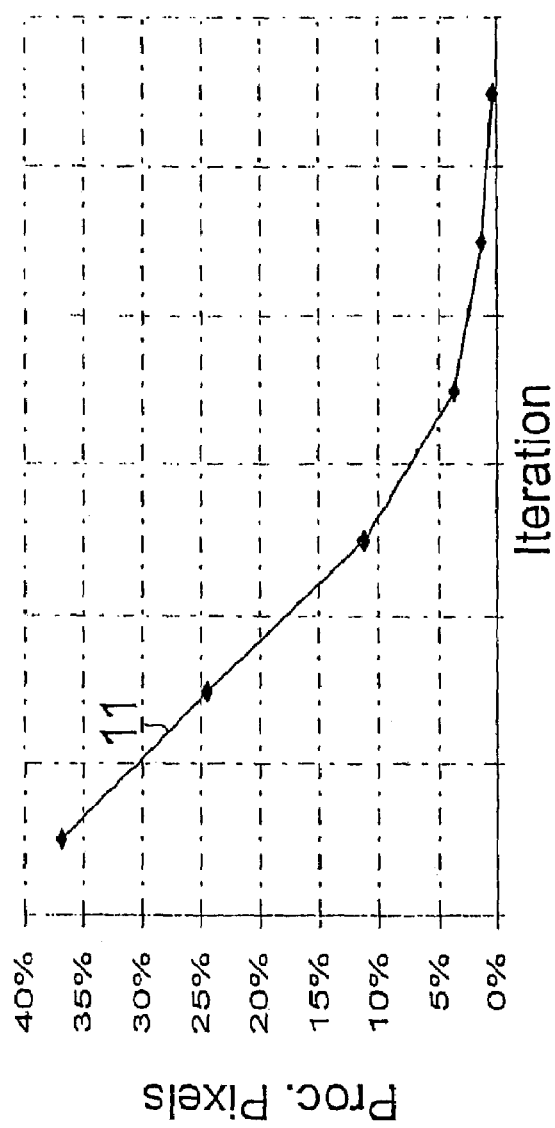
FIGS. 5a and 5b show the results of experimental tests relating to the method in accordance with the present invention.
Figure 5B:
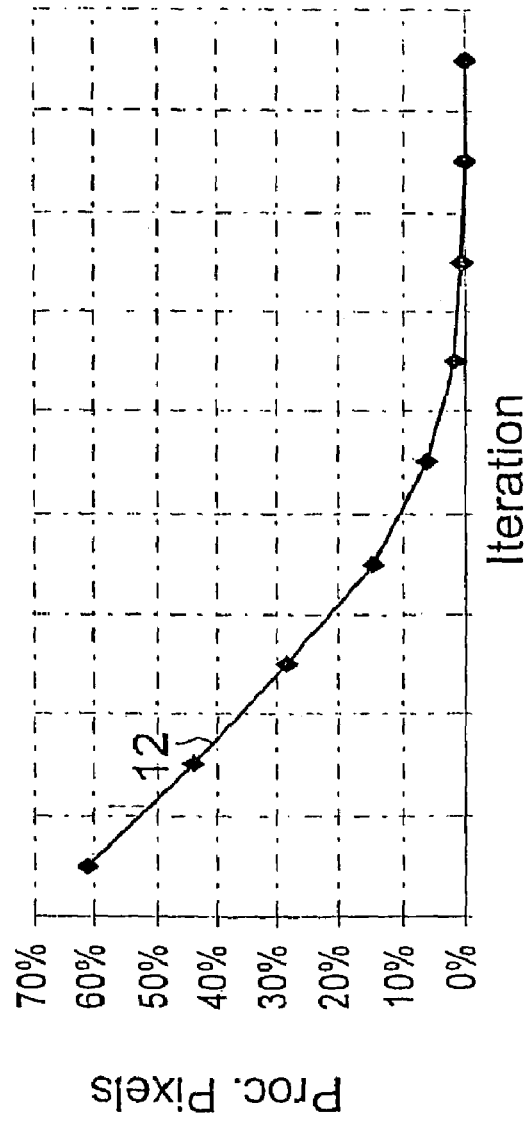

The curves 11 and 12 reproduced in FIGS. 5a and 5b illustrate the results obtained with, respectively, a first and a second image, the two images being different, though both had a high spectral content. These curves represent the percentage of the total number of pixels that had to be processed (at each step) and are plotted against the number of iterations. As can be seen from curve 11, the number of pixels processed in the first iteration can even be less than 40% and decreases exponentially thereafter. Curve 11 also shows that convergence in the case of the first image is attained by six iterations.

The graphs of FIGS. 6a and 6b, on the other hand, provide a comparison in terms of quality between the performance of the method in accordance with the present invention, which in the figure is indicated as optimized back projection, and a conventional back projection method like the one used by Irani-Peleg, which the figure indicates as classic back projection. The results of FIGS. 6a and 6b refer, respectively, to the first and the second image of the previous figures and are expressed in terms of PSNR (Peak-to-Peak Signal to Noise Ratio). The PSNR is a standard-type measure and indicates the quantity of the signal with respect to the quantity of noise introduced. It is important to note, as is readily brought out by the graphs, that the method in accordance with the invention, even though it performs a smaller number of processings, is capable of providing a performance in terms of quality that is superior to what can be obtained by conventional techniques.

The results obtained by the invention are explained by the fact that the proposed method selects the pixels according to their uncertainty content, and therefore does not tend to render common, or to use another term, does not smooth zones of the image that are almost certain and do not need processing, thus avoiding the introduction of noise into these zones.

With regards to the image of FIG. 5a, in particular, the method in accordance with the invention obtained PSNR values greater than 36 dB, while the conventional method achieved a PSNR of about 33 dB. In FIG. 6b the gain in terms of PSNR of the method of the invention amounts to about 2 dB.

Another reason why the proposed method assures excellent performance as compared with the classic back projection methods is due to the fact that the latter provides good results if they have at their disposal an accurate model of the acquisition process/device. When they use less accurate models such as the simple average formation mentioned above, the classic methods no longer succeed in assuring better performances than the method in accordance with the invention. This aspect is of great importance when one bears in mind that the method in accordance with the present invention is particularly suitable for being implemented in commercial devices, which are usually expected to possess a certain versatility and to be simple in use, characteristics that could not be obtained if the performance were to be critically dependent on the chosen model.

Obviously, a person skilled in the art, especially when having to satisfy contingent and specific needs, could introduce numerous modifications and variations into the method for obtaining a high-resolution digital image as described above, though these would still remain within the protection limits of the invention as defined by the claims set out below.

That which is claimed is:

1. A method for obtaining a high-resolution digital image from a plurality of starting images formed by pixel matrices acquired at a lower resolution, the method comprising:
   combining the plurality of starting images to generate a provisional high-resolution image;
   producing from the provisional high-resolution image a plurality of low-resolution images, each low-resolution image corresponding to a respective starting image; and
   processing at least a portion of the provisional high-resolution image by modifying pixels thereof to reduce a difference between the plurality of starting images and the plurality of low-resolution images, the processing comprising
      associating with the pixels of the provisional high-resolution image a respective uncertainty measure representing an uncertainty of the pixels, and
      leaving unmodified at least a subset of the pixels of the provisional high-resolution image having associated therewith a respective uncertainty measure smaller than a threshold.

2. A method according to claim 1, wherein each pixel of the provisional high-resolution image is obtained by combining values of common pixels of the plurality of starting images; and wherein the uncertainty measure associated with a respective pixel is obtained based upon digital values of the common pixels of the plurality of starting images.

3. A method according to claim 2, wherein combining the plurality of starting images comprises averaging the digital values of the common pixels thereof.

4. A method according to claim 2, wherein associating the pixels of the provisional high-resolution image with a respective uncertainty measure comprises generating a statistical characterization of distribution of the common pixels of the starting images that generated the corresponding pixel when the plurality of staring image were combined.

5. A method according to claim 2, wherein the uncertainty measure of a pixel of the provisional high-resolution image is correlated with the difference between a high value and a low value of the digital values of the common pixels of the starting images that generated the corresponding pixel when the plurality of staring image were combined.

6. A method according to claim 1, wherein the plurality of starting images are representative of a same real scene and reproduce different and at least partially superposed portions that are misaligned with respect to each other; and further comprising estimating the misalignment of the plurality of starting images with respect to each other before the provisional high-resolution image is generated.

7. A method according to claim 6, wherein the estimating is based upon at least one of a global motion technique and a local motion technique.

8. A method according to claim 1, further comprising expanding the plurality of starting images to a resolution substantially equal to a resolution of the provisional high-resolution image, the expanding being performed before the provisional high-resolution image is generated.

9. A method according to claim 8, wherein the expanding reproduces pixels of the plurality of starting images.

10. A method according to claim 2, wherein processing the provisional high-resolution image further comprises leaving unmodified pixels thereof that have been obtained by combining the common pixels of the plurality of starting images having a range of digital values not readily perceived by a human eye.

11. A method according to claim 1, wherein producing the plurality of low-resolution images comprises simulating an acquisition process of these images.

12. A method according to claim 11, wherein producing the plurality of low-resolution images comprises averaging blocks of pixels of the provisional high-resolution image to obtain individual pixels of the images of the plurality of low-resolution images.

13. A method according to claim 1, wherein the plurality of starting images are in a YCrCb format, including a luminance component and two chrominance components, and wherein 8-bit digital values are associated with each pixel.

14. A method according to claim 13, wherein the producing and processing steps are carried out only for the luminance component Y of the plurality of starting images.

15. A method according to claim 1, wherein the processing iteratively comprises:
   evaluating for each pixel of the provisional high-resolution image a respective error correlated with the difference between corresponding images of the plurality of starting images and the plurality of low-resolution images;
   modifying pixels of the provisional high-resolution image to render the error smaller than a threshold error, the modifying generating an improved provisional high-resolution image; and
   generating from the improved provisional high-resolution image a plurality of improved low-resolution images, each of which corresponds to a respective image of the plurality of starting images.

16. A method for obtaining a high-resolution digital image comprising:

combining a plurality of starting images formed by pixel matrices acquired at a lower resolution to generate a provisional high-resolution image;

producing from the provisional high-resolution image a plurality of low-resolution images, each low-resolution image corresponding to a respective starting image; and processing at least a portion of the provisional high-resolution image to reduce a difference between the plurality of starting images and the plurality of low-resolution images by performing the following associating with pixels of the provisional high-resolution image a respective uncertainty measure representing an uncertainty of the pixels, and leaving unmodified at least a subset of the pixels of the provisional high-resolution image having associated therewith a respective uncertainty measure smaller than a threshold.

17. A method according to claim 16, wherein each pixel of the provisional high-resolution image is obtained by combining values of common pixels of the plurality of starting images; and wherein the uncertainty measure associated with a respective pixel is obtained based upon digital values of the common pixels of the plurality of starting images.

18. A method according to claim 16, wherein the plurality of starting images are representative of a same real scene and reproduce different and at least partially superposed portions that are misaligned with respect to each other; and further comprising estimating the misalignment of the plurality of starting images with respect to each other before the provisional high-resolution image is generated.

19. A method according to claim 18, wherein the estimating is based upon at least one of a global motion technique and a local motion technique.

20. A method according to claim 16, further comprising expanding the plurality of starting images to a resolution substantially equal to a resolution of the provisional high-resolution image, the expanding being performed before the provisional high-resolution image is generated.

21. A method according to claim 17, wherein processing the provisional high-resolution image further comprises leaving unmodified pixels thereof that have been obtained by combining the common pixels of the plurality of starting images having a range of digital values not readily perceived by a human eye.

22. A method according to claim 16, wherein the plurality of starting images are in a YCrCb format, and wherein the producing and processing steps are carried out only for the luminance component Y of the plurality of starting images.

23. A method according to claim 16, wherein the processing iteratively comprises:

evaluating for each pixel of the provisional high-resolution image a respective error correlated with the difference between corresponding images of the plurality of starting images and the plurality of low-resolution images;

modifying pixels of the provisional high-resolution image to render the error smaller than a threshold error, the modifying generating an improved provisional high-resolution image; and generating from the improved provisional high-resolution image a plurality of improved low-resolution images, each of which corresponds to a respective image of the plurality of starting images.

24. An acquisition device comprising an acquisition unit for acquiring analog values representing a plurality of starting images;

an analog-to-digital converter for converting the analog values into digital values; and an image generation unit receiving the digital values of the plurality of starting images and performing the following combining the digital values of the plurality of starting images to generate a provisional high-resolution image, producing from the provisional high-resolution. image a plurality of low-resolution images, each low-resolution image corresponding to a respective starting image, and processing at least a portion of the provisional high-resolution image by modifying pixels thereof to reduce a difference between the plurality of starting images and the plurality of low-resolution images by associating with the pixels of the provisional high-resolution image a respective uncertainty measure representing an uncertainty of the pixels, and leaving unmodified at least a subset of the pixels of the provisional high-resolution image having associated therewith a respective uncertainty measure smaller than a threshold.

25. An acquisition device according to claim 24, wherein said acquisition unit comprises:

a lens system for focusing light radiations produced by a real scene; and a sensor for receiving the focused light radiations, and for generating the analog values representing the plurality of starting images.

26. An acquisition device according to claim 24, further comprising an encoder connected to said image generation unit for coding the provisional high-resolution image.

27. An acquisition device according to claim 24, wherein each pixel of the provisional high-resolution image is obtained by combining values of common pixels of the plurality of starting images; and wherein the uncertainty measure associated with a respective pixel is obtained based upon digital values of the common pixels of the plurality of starting images.

28. An acquisition device according to claim 24, wherein the plurality of starting images are representative of a same real scene and reproduce different and at least partially superposed portions that are misaligned with respect to each other; and wherein said image generation unit further estimates the misalignment of the plurality of starting images with respect to each other before the provisional high-resolution image is generated.

29. An acquisition device method according to claim 24, wherein said image generation unit expands the plurality of starting images to a resolution substantially equal to a resolution of the provisional high-resolution image, the expanding being performed before the provisional high-resolution image is generated.

30. An acquisition device according to claim 27, wherein said image generation unit leaves unmodified pixels of the provisional high-resolution image that have been obtained by combining the common pixels of the plurality of starting images having a range of digital values not readily perceived by a human eye.

31. An acquisition device according to claim 24, wherein the plurality of starting images are in a YCrCb format, and the producing and processing by said image generation unit are carried out only for the luminance component Y of the plurality of starting images.

32. An acquisition device according to claim 24, wherein said image generation unit also performs the following evaluating for each pixel of the provisional high-resolution image a respective error correlated with the difference between corresponding images of the plurality of starting images and the plurality of low-resolution images;

modifying pixels of the provisional high-resolution image to render the error smaller than a threshold error, the modifying generating an improved provisional high-resolution image; and generating from the improved provisional high-resolution image a plurality of improved low-resolution images, each of which corresponds to a respective image of the plurality of starting images.

33. An acquisition device according to claim 24, wherein said acquisition unit, said analog-to-digital converter and said image generation unit are configured so that the acquisition device is a digital camera.

* * * * *

UNITED STATES PATENT AND TRADEMARK OFFICE
CERTIFICATE OF CORRECTION

PATENT NO. : 7,260,277 B2  Page 1 of 1
APPLICATION NO. : 10/420532
DATED : August 21, 2007
INVENTOR(S) : Messina et al.

It is certified that error appears in the above-identified patent and that said Letters Patent is hereby corrected as shown below:

Title Page (30) Missing Priority Data    Insert: -- (30) Foreign Application Priority Data
April 23, 2002   EP.........024252629 --

Column 3, Line 64    Delete: "presenting"
Insert: -- present --

Column 4, Line 9    Delete: "processed"
Insert: -- process --

Column 4, Line 23    Delete: "will brought"
Insert: -- will be brought --

Column 14, Line 12    Delete: "high-resolution. image"
Insert: -- high-resolution image --

Signed and Sealed this

Fifteenth Day of April, 2008

JON W. DUDAS
*Director of the United States Patent and Trademark Office*